United States Patent
Okuley et al.

(10) Patent No.: US 6,572,282 B1
(45) Date of Patent: Jun. 3, 2003

(54) DIGITAL CAMERA STAND WITH INDEXED TILT FEATURE

(75) Inventors: James M. Okuley, Portland, OR (US); Mike G. MacGregor, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/025,300

(22) Filed: Dec. 18, 2001

(51) Int. Cl.⁷ .................. G03B 17/00; H04N 5/225; A47F 5/12
(52) U.S. Cl. .................. 396/428; 348/373; 248/140
(58) Field of Search .................. 396/428, 419, 396/427; 348/373, 374, 375, 552; 248/127, 178.1, 183.4, 346.01, 133, 139, 140, 397, 407

(56) References Cited

U.S. PATENT DOCUMENTS

| | | | | |
|---|---|---|---|---|
| 5,734,414 A | * | 3/1998 | Nishimura et al. | 348/14 |
| 5,752,113 A | * | 5/1998 | Borden | 396/428 |
| 5,857,119 A | * | 1/1999 | Borden | 396/5 |
| 5,870,642 A | * | 2/1999 | Mittelstaedt et al. | |
| 6,359,652 B1 | * | 3/2002 | Takada | 348/374 |

* cited by examiner

Primary Examiner—David M. Gray
Assistant Examiner—Rochelle Blackman
(74) Attorney, Agent, or Firm—Marger Johnson & McCollom, PC

(57) ABSTRACT

A digital camera stand comprising a main body and a tilting body received within a cavity formed within a top portion of the main body and coupled to the main body along a pivot axis. The tilting body includes indexed portions, preferably a parallel arrangement of notches formed along the back portion of the tilting body, adapted to engage with an indexer coupled to the main body to allow indexed tilting of the tilting body relative to the main body as the indexer is engaged with a selected one of the notches. One end of a data connector is received through a shell of the tilting body and presents a data connection adapted to couple with a complementary connector on a base portion of the digital camera maintained within a pocket of the tilting body.

18 Claims, 10 Drawing Sheets

DIGITAL CAMERA STAND WITH INDEXED TILT FEATURE

BACKGROUND OF THE INVENTION

This invention relates generally to mounting devices and, more particularly, to docking stations for digital movie and/or still cameras.

Cameras that take video pictures for transmission in real time over the Internet (often referred to as "web cams") are becoming more popular as capable computer and Internet video transmission systems have advanced. Most web cams are of the integrated type with the camera portion integrated with its stand. This makes the camera less useful as a tool that can be detached from the computer, used, and then reattached for transfer and transmission of the video or still images taken to another via e-mail.

An important aspect of these web cams is that they be easily adjustable so that the camera lens is pointed at the face of the user. This is a non-trivial problem from a stability and ease-of-use standpoint. While some camera stands exist in the art for receiving a camera and then transmitting digital images to a computer, these existing designs are seen as deficient.

Accordingly, the need remains for an improved design for a digital camera stand that overcomes drawbacks that exist in the prior art.

BRIEF DESCRIPTION OF THE DRAWINGS

The objects, features and advantages of the invention will become more readily apparent from the following detailed description of a preferred embodiment of the invention that proceeds with reference to the accompanying drawings.

DETAILED DESCRIPTION

Figure 1:
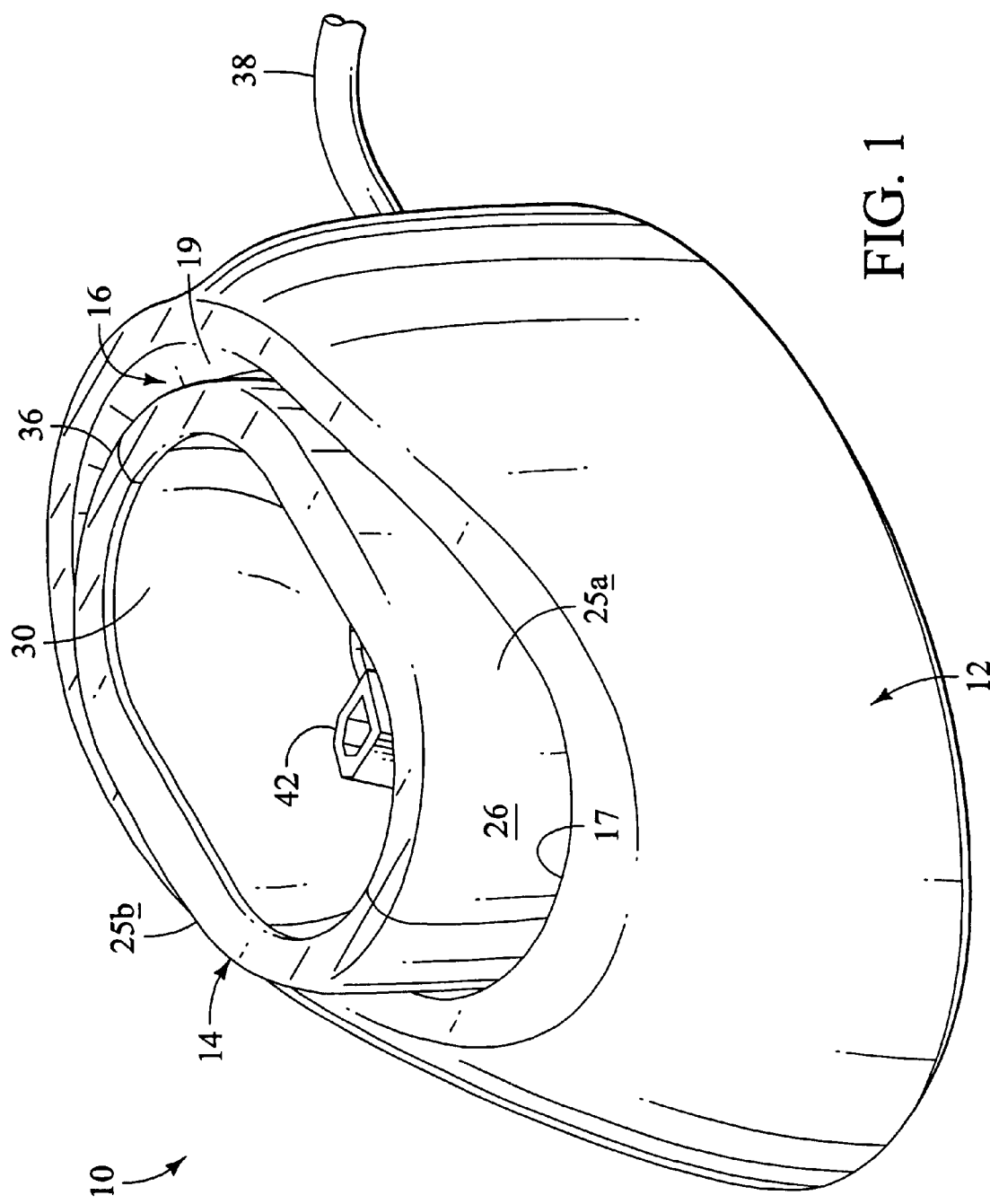
FIG. 1 is a perspective view of a digital camera stand constructed according to a preferred embodiment of the invention.
Figure 2:
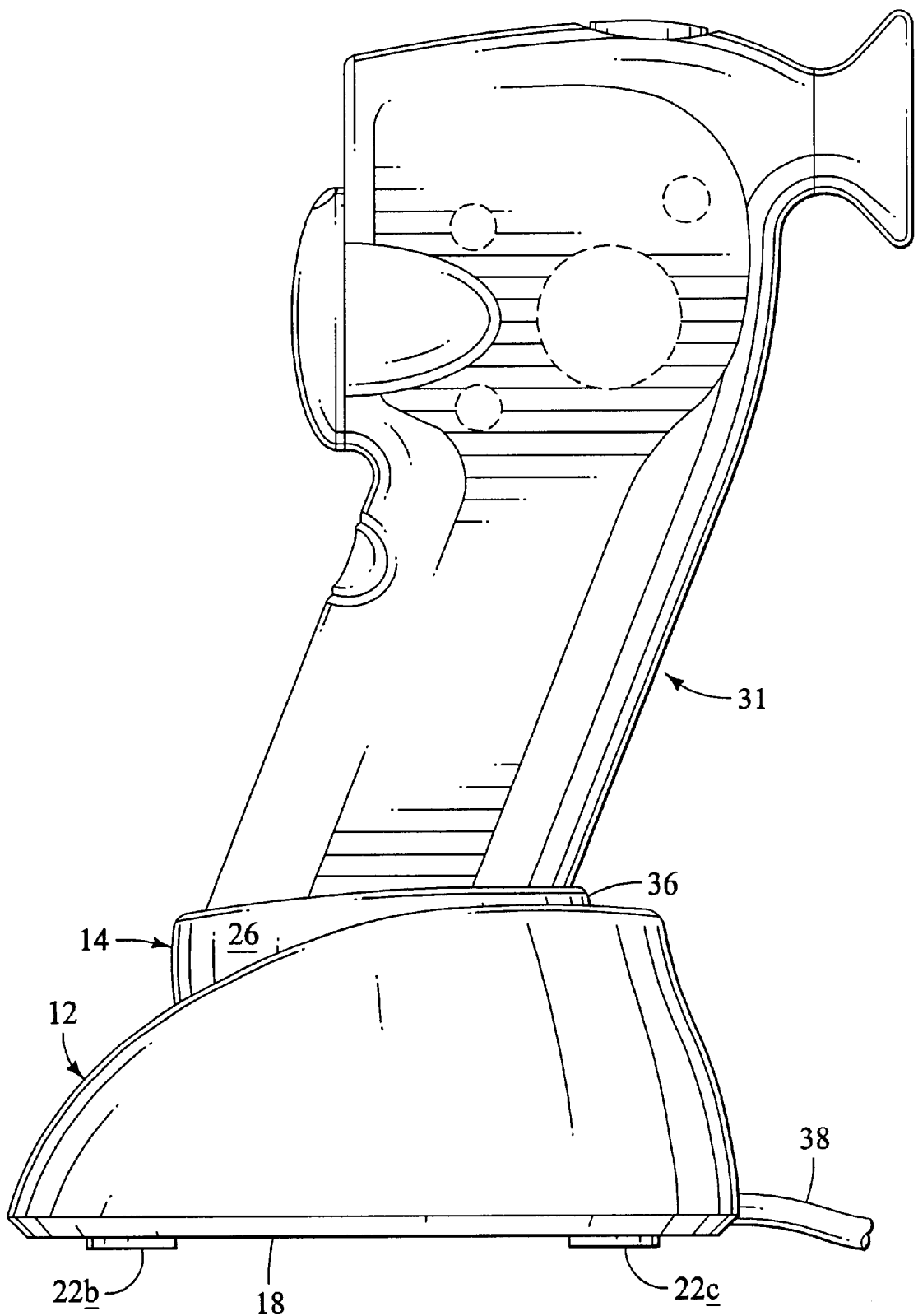
FIG. 2 is a left side elevation view of the digital camera stand of FIG. 1 engaged with a digital camera.
Figure 3:
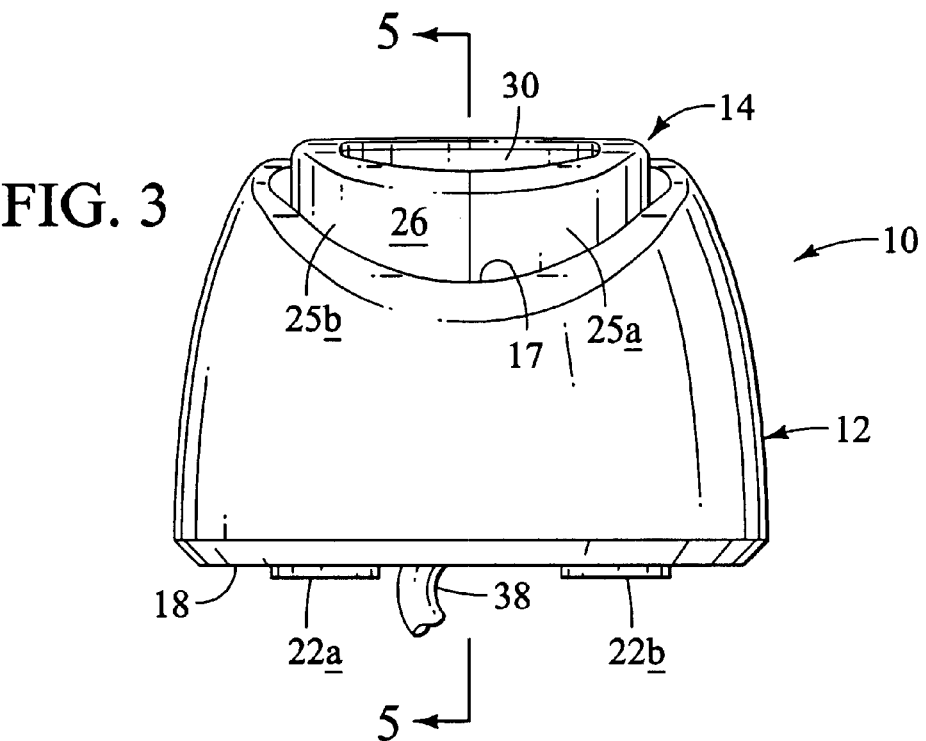
FIG. 3 is a front elevation view of the digital camera stand of FIG. 1.

A digital camera stand, as constructed according to a preferred embodiment of the invention, is shown generally at 10 in FIG. 1. Camera stand 10 includes a main body 12 and a tilting body 14 received within a cavity 16 formed within a top portion of the main body. The cavity 16 includes a downwardly-extending rim with the front portion 17 thereof lower than a back rim portion 19 so that the cavity 16 is preferably shallower adjacent a front portion of the main body than the back portion as shown in FIGS. 1–3.

Figure 5:
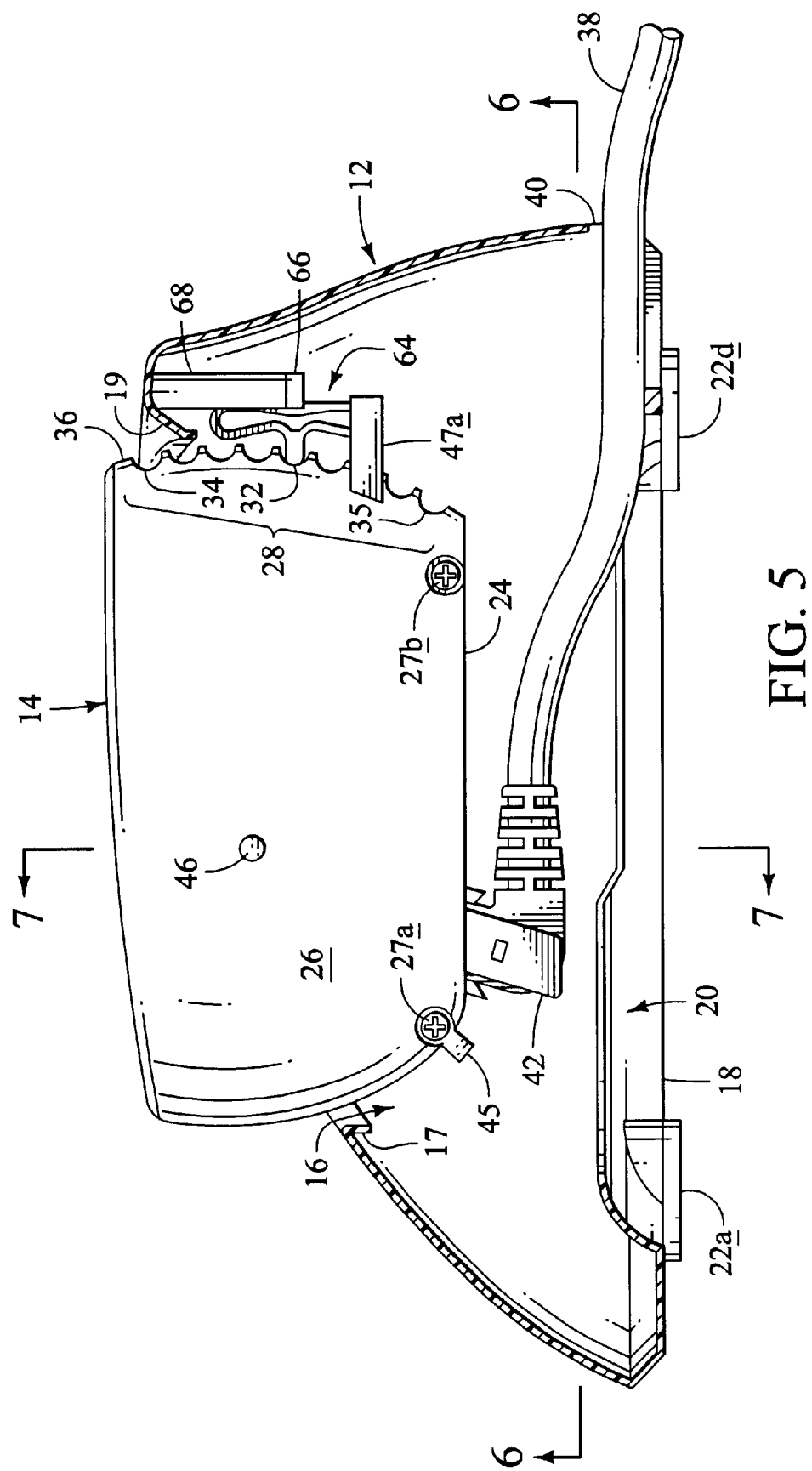
FIG. 5 is a sectional view of the digital camera stand of the present invention from a left side thereof taken along line 5—5 in FIG. 3.

As shown best in FIG. 5, main body 12 includes a flat base 18 formed on an underside portion with an opening 20 between the underside portion and the cavity 16. Rubber pads 22a, 22b, 22c and 22d are attached to the flat base to prevent the main body from sliding when placed on a tabletop.

The tilting body 14 is received within the cavity 16 so that a bottom portion 24 of the tilting body is exposed to the opening 20 on the flat base portion 18. The tilting body 14 is formed by the joining of two injection molded half pieces 25a, 25b as by screws 27a, 27b, has an exterior wall 26 with indexed portions 28 formed thereon, and has an interior wall forming a pocket 30 adapted to receive a base portion of a digital camera 31 (FIG. 2). The indexed portions 28 preferably include a plurality of notches, such as notches 32, 34 and 35, arranged in parallel along a back portion 36 of tilting body 14 from a top portion thereof to a bottom portion.

Figure 4:
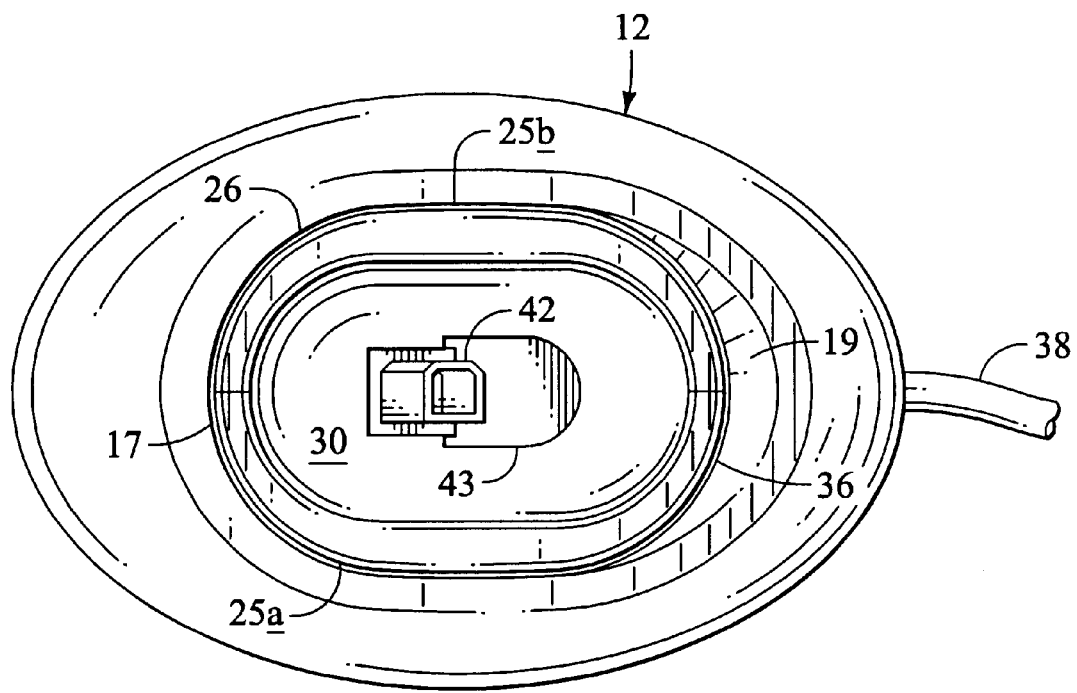
FIG. 4 is top plan view of the digital camera stand of FIG. 1.

The camera stand 10 is electronically coupled to a computer (not shown) via data transfer means such as a standard Universal Serial Bus (USB) cable 38. The cable 38 has a distal end (not shown) adapted to be coupled to the computer, and a proximal end that is received through an aperture 40 located through the back portion of the main body 12. The proximal end includes a data connector 42 that is received through the opening 20, exposing the underside of the tilting body 14, and into the bottom portion of the tilting body 14 through aperture 43, as shown best in FIGS. 4 and 5. Data connector 42 is adapted to couple with a complementary connector located on a base portion of the digital camera received within the pocket of the tilting body. It is understood by those knowledgeable in the art that other data transmission means can be used to transmit data between the camera stand and a computer and that the invention is not intended to be limited to USB or even physical cabling but that wireless transmitter/receiver means can also be used.

Figure 6:
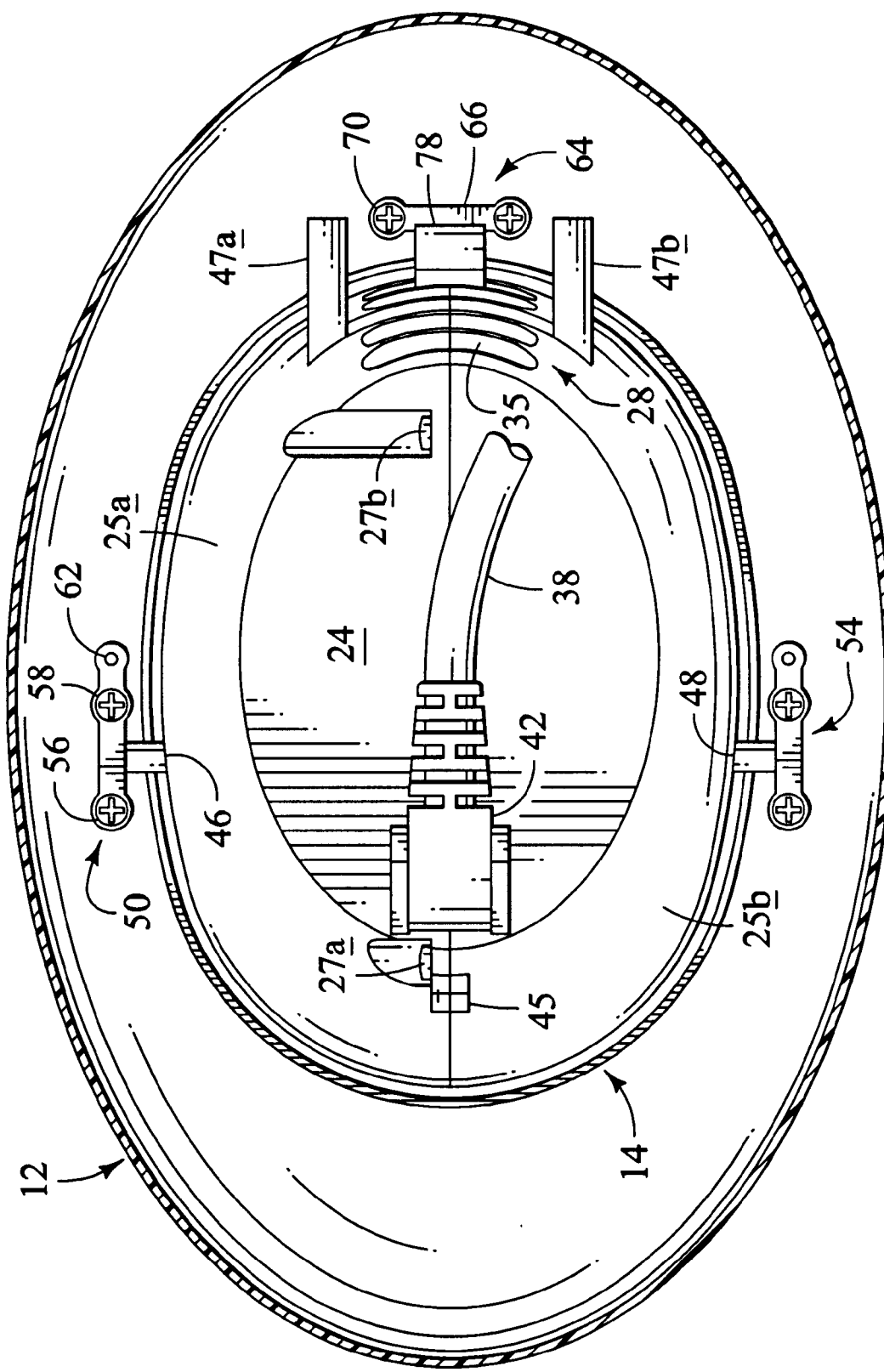
FIG. 6 is a sectional view of the digital camera stand of the present invention from an underside thereof taken along line 6—6 in FIG. 5.

FIG. 6 illustrates an underside view of the camera stand 10 in partial sectioned view. Affixed to a front portion of tilting body 14 is a forward tab 45 that extends out from the tilting body outer shell 26 and is adapted to contact the forward rim 17 of main body 12 to define a maximally rearward tilting angle when the indexer 64 (described below) is engaged with the topmost notch 34 as shown best in FIG. 16. Affixed to a back portion of tilting body 14 is a pair of backward-facing tabs 47a, 47b that contact the rearward rim 19 of main body 12 to define a maximally forward tilting angle when the indexer 64 is engaged with the bottommost notch 35 as shown best in FIG. 15. Tabs 47a and 47b are spaced to allow the indexer to pass between them as the camera stand is tilted (see, e.g., FIGS. 5, 6 and 15).

Figure 8:
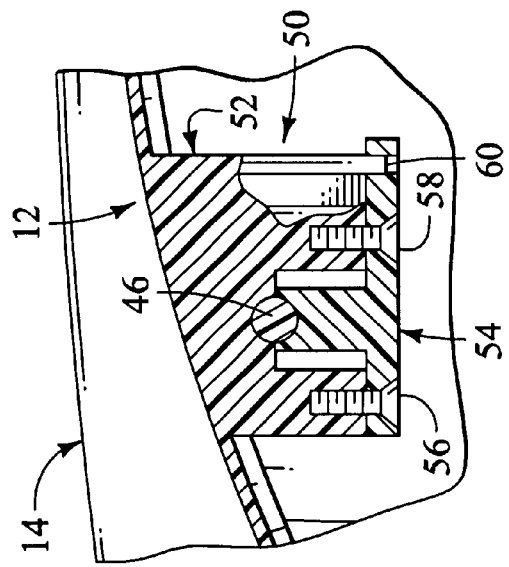
FIG. 8 is a sectional view of the pivot mount portion of the digital camera stand of the present invention taken along line 8—8 in FIG. 7.
Figure 7:
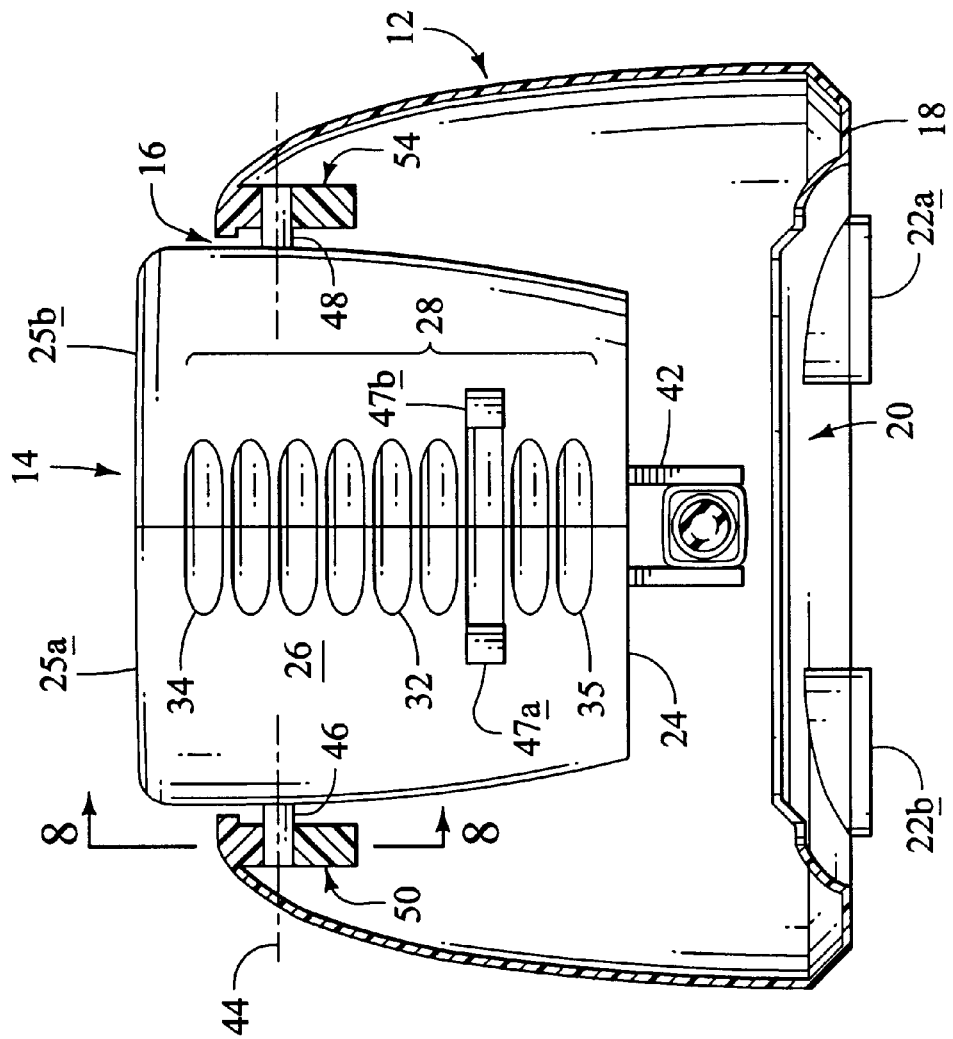
FIG. 7 is a sectional view of the digital camera stand of the present invention from a back end thereof taken along line 7—7 in FIG. 5.
Figure 9:
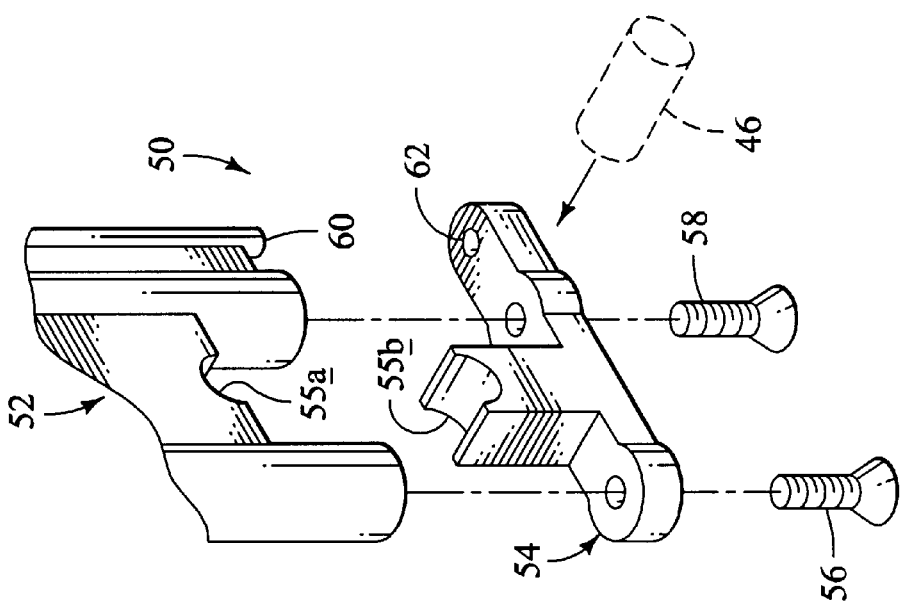
FIG. 9 is an exploded perspective view of the pivot mount portion of the digital camera stand shown in section in FIG. 8 constructed according to a preferred embodiment of the invention.
Figure 12:
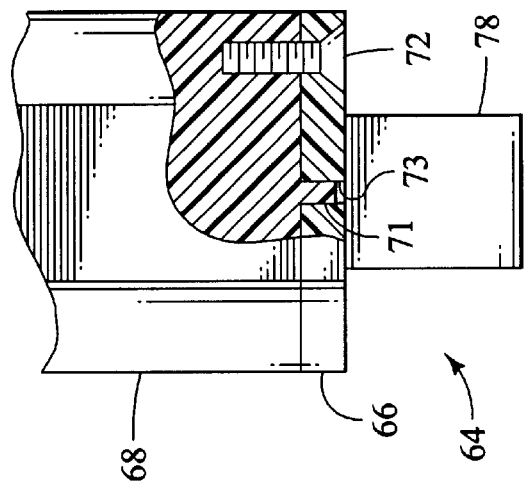
FIG. 12 is a partial sectioned view of the indexer of FIG. 10.

Turning next to FIG. 7, the tilting body 14 is pivotally coupled to the main body 12 along a pivot axis 44 formed by a pair of coaxial pins 46, 48 fixed to the exterior wall 26 of tilting body 14. Referring to FIGS. 7–9, each pin 46 is received within a pivot mount 50 formed by conjoining an upper mount portion 52 and a lower mount portion 54. Upper mount portion 52 includes a semicircular cutout 55a that mates with a complementary cutout 55b on the lower mount portion 54 to form a circular aperture that receives pin 46 therethrough.

During construction of the camera stand 10, the coaxial pins 46 are placed within apertures formed by respective pivot mounts 50 and the lower mount portions 54 are fastened to the upper mount portions 52 as by screws 56 and 58. To prevent the lower mount portion 54 from being inserted upside-down, the apertures that receive screws 56, 58 are countersunk to receive the angled heads of the screws for a flush fit. A further pin 60 and pin receiving aperture 62 can be included on one side of the pivot mount 50, thus making the mount asymmetric and less prone to backward assembly during construction.

Attention is now directed to FIGS. 10–14 with a continued discussion of the indexing features of the invention. The purpose of the indexing feature is to tilt the tilting body 14 relative to the main body 12 at a predefined one of a plurality of angles along the pivot axis 44. This results in the pointing direction of a digital camera 31, received within tilting body pocket 30, to be changed in one dimension (up and down) to a selected one of a limited number of directions to accommodate taller or shorter users of the camera, or taller or shorter mounting heights.

Figure 10:
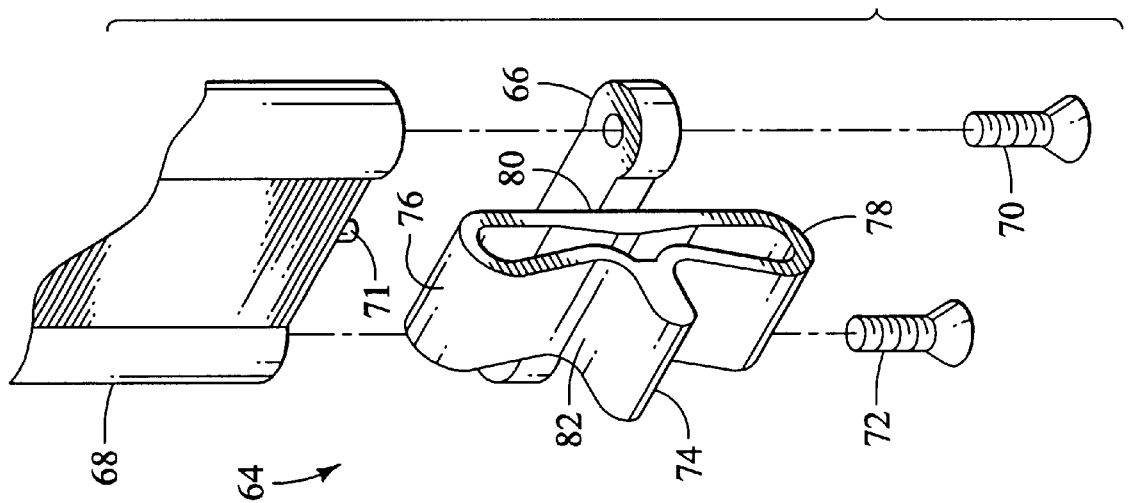
FIG. 10 is an exploded perspective view of the indexer used in the digital camera stand of FIG. 1 and constructed according to a first embodiment of the invention.
Figure 11:
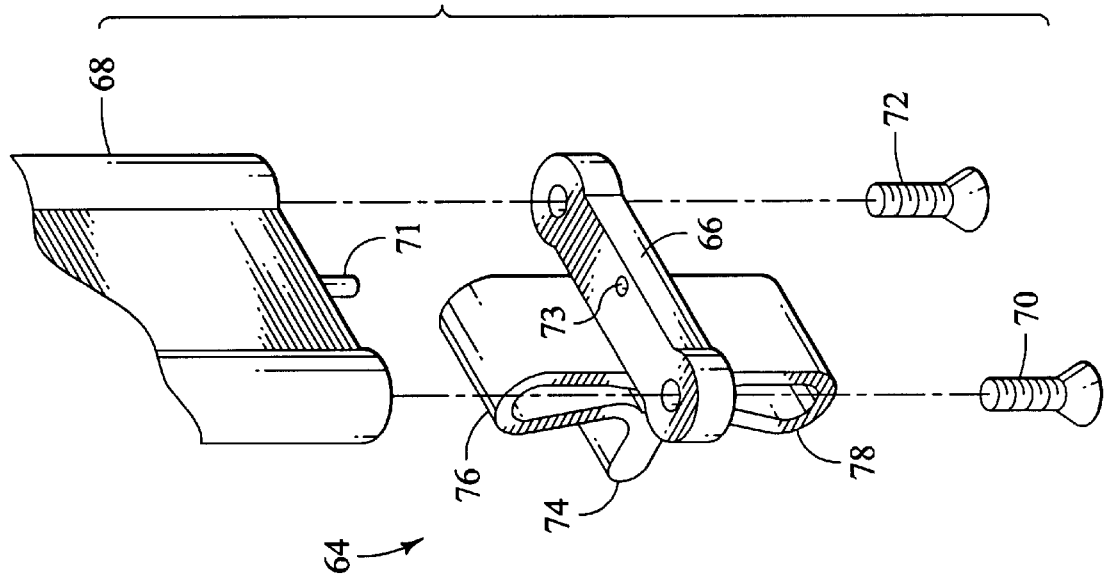
FIG. 11 is an exploded perspective view of the indexer of FIG. 10 from a reverse side.

An exploded view of the indexer 64, constructed according to a first embodiment of the invention, is shown in FIGS. 10 and 11 and includes a mounting portion 66 coupled to a downwardly extending anchor assembly 68 of the main body 12 via screws 70, 72. A downwardly extending pin 71 on anchor assembly 68 is received within a complementary aperture 73 formed within mounting portion 66 to ensure that the indexer 64 is not installed upside down (see FIG. 12). An engagement member, shown by tab 74, is coupled to mounting portion 66 via biasing means adapted to maintain the engagement member in a fixed position relative to the mounting portion. In a preferred embodiment, the biasing means includes a pair of U-shaped members 76, 78 having first and second ends—such as ends 80 and 82—resiliently biased a fixed distance from one another with the first end 80 fixed to the mounting portion 66 of the indexer 64 and the second end 82 fixed to the engagement member 74. The resulting assembly allows the engagement member to "click" into engagement with a selected one of the notches 32 formed along the back portion of the tilting body 14.

Figure 14:
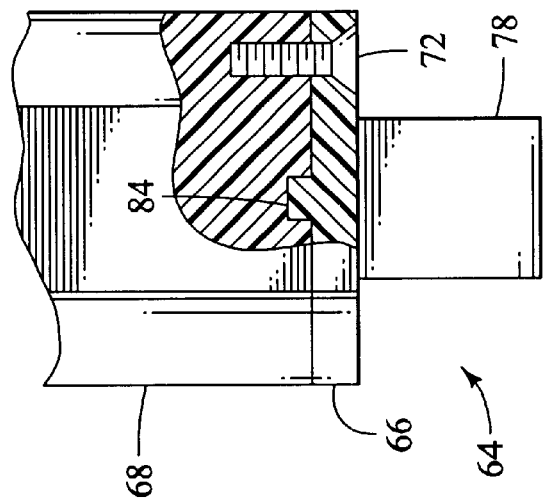
FIG. 14 is a partial sectioned view of the indexer of FIG. 13.
Figure 13:
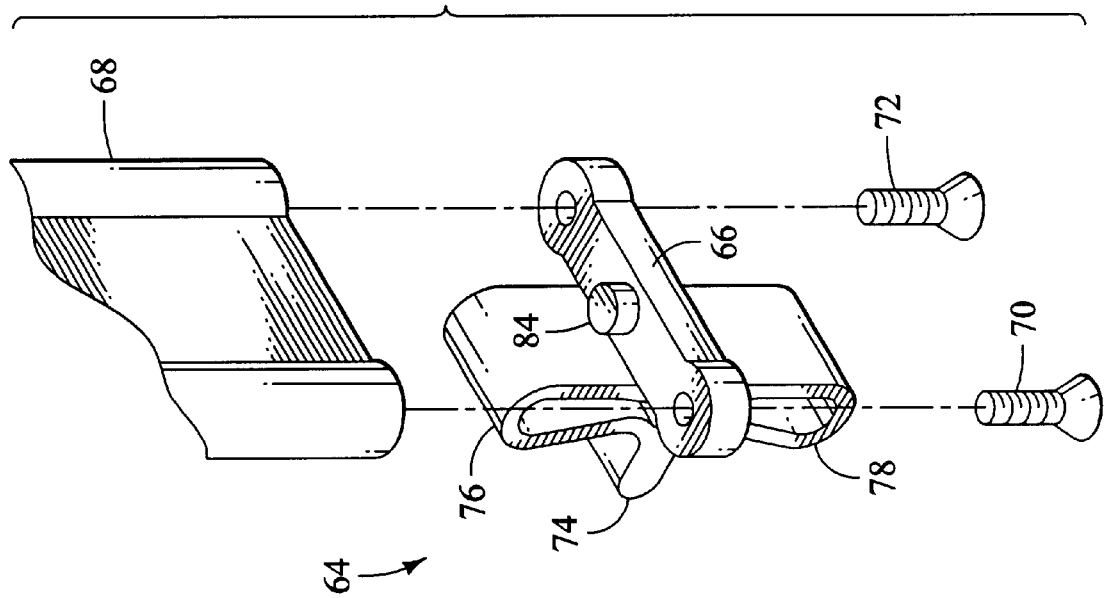
FIG. 13 is an exploded perspective view of the indexer according to a second embodiment of the invention.

FIGS. 13 and 14 illustrate an alternate embodiment of the indexer assembly 64 where, instead of the pin 71, fixed to the anchor assembly 68, being received within a complementary aperture formed on the mounting portion 66 (as with the embodiment shown in FIGS. 10–12), a pin 84 is located on the mounting portion 66 and is received within a complementary aperture formed in the anchor assembly to help prevent incorrect assembly of the indexer to the main body 12.

Figure 15:
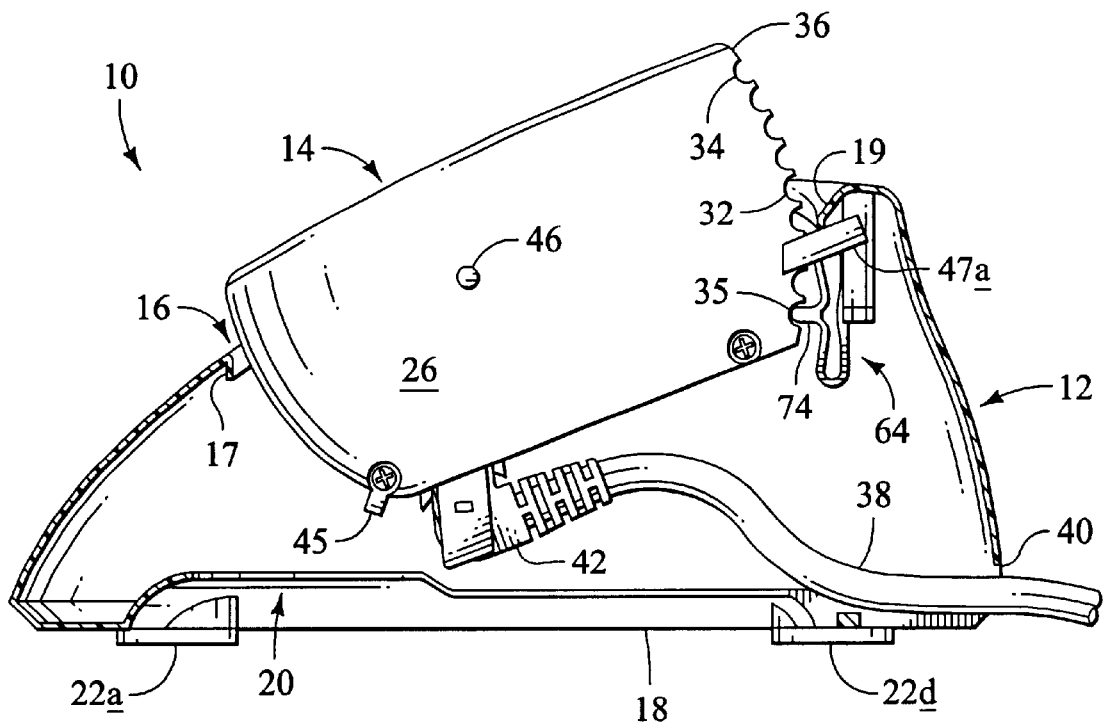
FIG. 15 is a sectional view similar to FIG. 5 with the digital camera stand pivoted to its maximum forward tilt position.

Referring to FIG. 15, downward pressure applied by the user to a front end of the tilting body 14 causes the tilting body to pivot on axis 44, thereby causing the back end 36 to rise. Notch 32 is formed with an arcuate shape and are adapted to engage with the complementary rounded outer surface of the engagement member 74 received within the notch. Upward pressure on the back end 36 of tilting body 14 forces the engagement member 74 to be biased backward out of the respective notch 32 by overcoming the position maintenance forces exerted by the biasing means of indexer 64. As the tilting body 14 rotates upward, the notch located immediately below the respective notch 32 is rotated into engagement with engagement member 74 so that the biasing forces exerted by the now-compressed U-shaped members 82, 84 forces the engagement member forward into engagement with the new notch. Continued downward pressure on the front end front end of the tilting body 14 causes the back end 36 to rise until the backward-facing tabs 47a, 47b contact the back rim portion 19 of the main body cavity 16 and the engagement tab 74 engages with the bottommost notch 35 so that the tilting body 14 is in the maximally forward tilting position, resulting in the digital camera 31 received within the mount to face primarily downward.

Figure 16:
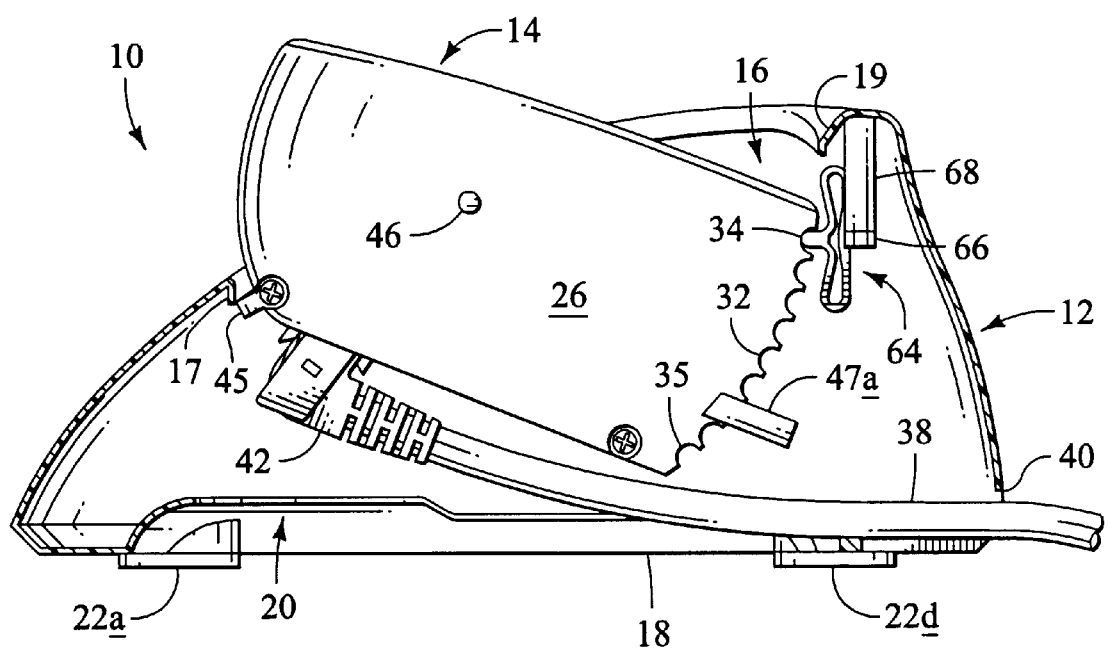
FIG. 16 is a sectional view similar to FIG. 5 with the digital camera stand pivoted to its maximum rearward tilt position.

In the alternative and referring to FIG. 16, the tilting body 14 can be rotated in the opposite direction by applying pressure on the back end of the body rather than the front so that the forwardly facing tab 45 fixed to the front side of the tilting body outer shell 26 contacts the front rim portion 17 of the main body cavity 16 and the engagement tab 74 engages with the topmost notch 34 so that the tilting body is in the maximally rearward tilting position, resulting in the digital camera 31 received within the mount to face primarily upward.

The user manipulation on the camera mount 10 results in movement of the data cable insertion point 42 within the main body cavity 16 and corresponding movement of the data cable 38 so that it slides in and out of aperture 40 located at the back end of main body 12, or bends the cable as shown in FIG. 15.

Having described and illustrated the principles of the invention in a preferred embodiment thereof, it should be apparent that the invention can be modified in arrangement and detail without departing from such principles. Accordingly, we claim all modifications and variation coming within the spirit and scope of the following claims.

What is claimed is:

1. A stand for a digital camera comprising:
   a main body having a cavity formed within a top portion of the main body and a flat base formed on an underside portion of the main body with an opening between the underside portion and the cavity;
   a tilting body received within the cavity so that a bottom portion of the tilting body is exposed to the opening on the flat base portion, said tilting body having an exterior wall with indexed portions formed thereon and an interior wall forming a pocket adapted to receive a base portion of a digital camera;
   an indexer coupled to the main body and engaged with the indexed portions on the tilting body to allow indexed tilting of the tilting body relative to the main body; and
   a data connector received through the opening and into the bottom portion of the tilting body, said data connector adapted to couple with a complementary connector on the base portion of the digital camera received within the pocket of the tilting body.

2. The apparatus of claim 1, wherein the indexer includes a mounting portion coupled to the main body and an engagement member coupled to the mounting portion via a biasing means adapted to maintain the engagement member in a fixed position relative to the mounting portion.

3. The apparatus of claim 2, the indexer further including a pin formed on the mounting portion adapted to be received within a complementary aperture formed on the main body.

4. The apparatus of claim 2, the indexed portions including a plurality of notches arranged in parallel along a back portion of the tilting body, with the engagement member of the indexer being adapted to engage with a selected one of the notches.

5. The apparatus of claim 2, the biasing means including a pair of U-shaped members, each of the U-shaped members having first and second ends resiliently biased a fixed distance from one another with the first end fixed to the mounting portion of the indexer and the second end fixed to the engagement member.

6. The apparatus of claim 5, the indexed portions including a plurality of notches arranged in parallel along a back portion of the tilting body, with the engagement member of the indexer being adapted to engage with a selected one of the notches.

7. The apparatus of claim 1, the cavity of the main body being shallower adjacent a front portion of the main body than the back portion.

8. The apparatus of claim 1, further including means affixed to the exterior wall of the tilting body for contacting the main body when the tilting body is moved to an extreme tilting position to thereby define a range of potential tilting positions between a maximum and minimum angle.

9. The apparatus of claim 1, wherein the tilting body is coupled to the main body at a pair of coaxial pivot points.

10. A digital camera stand comprising:
   a main body;
   a tilting body coupled to the main body along a pivot axis;
   indexing means for tilting said tilting body relative to said main body at a predefined one of a plurality of angles along said pivot axis; and
   data transfer means having a distal end adapted to be coupled to a computer and a proximal end adjacent said tilting body for electrically coupling to a digital camera.

11. The apparatus of claim 10, wherein the tilting body includes a pocket formed on a top side thereof and an aperture formed at the bottom of the pocket through which is received the proximal end of the data transfer means.

12. The apparatus of claim 10, the indexing means including an engagement member coupled to the main body and adapted to engage with a selected one of a plurality of notches arranged in parallel along a back portion of the tilting body from a top portion thereof to a bottom portion.

13. The apparatus of claim 8, said main body including a cavity formed within a top portion thereof and adapted to receive the tilting body therein, said pivot axis being located within the cavity.

14. The apparatus of claim 10, further including means affixed to an exterior wall of the tilting body for contacting the main body when the tilting body is moved to an extreme tilting position to thereby define a range of potential tilting positions between a maximum and minimum angle.

15. The apparatus of claim 10, wherein the indexing means includes a mounting portion coupled to the main body and an engagement member coupled to the mounting portion via a biasing means adapted to maintain the engagement member in a fixed position relative to the mounting portion.

16. The apparatus of claim 15, the biasing means including a pair of U-shaped members, each of the U-shaped members having first and second ends resiliently biased a fixed distance from one another with the first end fixed to the mounting portion of the indexer and the second end fixed to the engagement member.

17. An indexer for use in a digital camera stand comprising:
   a mounting portion;
   an engagement member; and
   a pair of U-shaped members, each of the U-shaped members having first and second ends resiliently biased a fixed distance from one another with the first end fixed to the mounting portion of the indexer and the second end fixed to the engagement member.

18. The apparatus of claim 17, the indexer further including a pin formed on the mounting portion adapted to be received within a complementary aperture formed on a body to which the indexer is to be mounted.

* * * * *